US012200750B2

United States Patent
Lindoff et al.

(10) Patent No.: US 12,200,750 B2
(45) Date of Patent: *Jan. 14, 2025

(54) METHODS OF WIRELESS DEVICE AND NETWORK NODE, SUCH WIRELESS DEVICE AND NETWORK NODE, AND COMPUTER PROGRAMS THEREOF

(71) Applicant: Telefonaktiebolaget LM Ericsson (publ), Stockholm (SE)

(72) Inventors: Bengt Lindoff, Bjärred (SE); Robert Baldemair, Solna (SE); Stefan Parkvall, Bromma (SE)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 0 days.

This patent is subject to a terminal disclaimer.

(21) Appl. No.: 18/298,763

(22) Filed: Apr. 11, 2023

(65) Prior Publication Data

US 2023/0309135 A1   Sep. 28, 2023

Related U.S. Application Data

(63) Continuation of application No. 17/242,591, filed on Apr. 28, 2021, now Pat. No. 11,659,583, which is a (Continued)

(51) Int. Cl.
*H04W 72/542* (2023.01)
*H04B 7/0413* (2017.01)
(Continued)

(52) U.S. Cl.
CPC ......... *H04W 72/542* (2023.01); *H04L 5/0053* (2013.01); *H04L 5/0064* (2013.01);
(Continued)

(58) Field of Classification Search
CPC ......... H04W 4/90; H04W 74/08; H04W 4/70; H04W 68/00; H04W 68/005;
(Continued)

(56) References Cited

U.S. PATENT DOCUMENTS 11,412,535 B2 * 8/2022 Ye .................. H04L 5/0082
2010/0331030 A1   12/2010 Nory et al.
(Continued)

FOREIGN PATENT DOCUMENTS

CN      103298118 A    9/2013
CN      104662827 A    5/2015
(Continued)

OTHER PUBLICATIONS

"Change for DCI format 1A and 1C for broadcast control and update of DCI format", 3GPP TSG-RAN Meeting #54bis, R1-084077, Motorola, LGE, Panasonic, Philips, Samsung, NSN, Nortel, Prague, Czech Republic, Sep. 29-Oct. 3, 2008, 9 pages.
(Continued)

*Primary Examiner* — Iqbal Zaidi
(74) *Attorney, Agent, or Firm* — Murphy, Bilak & Homiller, PLLC

(57) ABSTRACT

A method of a wireless device comprises determining a bandwidth for monitoring a downlink control signal, determining a set of possible downlink control indicator, DCI, formats, wherein possible DCI formats are DCI formats compatible with the determined bandwidth, receiving a transmission from a network node, searching for control information in the transmission by decoding using at least one of the DCI formats of the set, and when successful decoding of the control information, performing at least one task associated with the control information. A method of a network node, comprises configuring a downlink bandwidth to be used at downlink transmissions, determining a DCI
(Continued)

format based on the downlink bandwidth, and transmitting control information using a DCI with the determined DCI format. A wireless device and a network node which are arranged to perform the methods, respectively, and computer programs for implementing the methods are disclosed.

15 Claims, 4 Drawing Sheets

Related U.S. Application Data continuation of application No. 16/695,794, filed on Nov. 26, 2019, now Pat. No. 11,019,636, which is a continuation of application No. 15/580,307, filed as application No. PCT/EP2017/077578 on Oct. 27, 2017, now Pat. No. 10,524,271.

(60) Provisional application No. 62/421,633, filed on Nov. 14, 2016.

(51) Int. Cl.
  *H04L 5/00* (2006.01)
  *H04W 72/23* (2023.01)

(52) U.S. Cl.
  CPC ........... *H04W 72/23* (2023.01); *H04B 7/0413* (2013.01); *H04L 5/0096* (2013.01)

(58) Field of Classification Search
  CPC ........... H04W 72/1289; H04W 72/044; H04L 1/1812; H04L 5/0048
  See application file for complete search history.

(56) References Cited

U.S. PATENT DOCUMENTS

| | | | |
|---|---|---|---|
| 2013/0010714 A1 | 1/2013 | Kim et al. | |
| 2013/0010720 A1 | 1/2013 | Lohr et al. | |
| 2014/0314007 A1* | 10/2014 | Chen | H04B 7/0619 370/329 |
| 2015/0071183 A1 | 3/2015 | Bontu et al. | |
| 2015/0358102 A1 | 12/2015 | Ko et al. | |
| 2016/0157277 A1* | 6/2016 | Hardouin | H04W 74/006 370/329 |

FOREIGN PATENT DOCUMENTS

| | | |
|---|---|---|
| CN | 105122861 A | 12/2015 |
| EP | 2525513 A2 | 11/2012 |
| EP | 2704349 A2 | 3/2014 |
| JP | 2010539847 A | 12/2010 |
| JP | 2013509044 A | 3/2013 |
| JP | 2015502089 A | 1/2015 |
| WO | 2009041785 A2 | 4/2009 |
| WO | 2010151424 A2 | 12/2010 |
| WO | 2011047353 A1 | 4/2011 |
| WO | 2011121774 A1 | 10/2011 |
| WO | 2013049768 A1 | 4/2013 |

OTHER PUBLICATIONS

"Mechanisms of bandwidth adaptation for control and data reception in single-carrier and multi-carrier cases", 3GPP TSG RAN WG1 Meeting #87, R1-1611655, Huawei, HiSilicon, Reno, USA, Nov. 14-18, 2016, 4 pages.

"Considerations on DCI Design for Higher Data Rate", 3GPP TSG RAN WG1 Meeting #87, R1-1612597, ZTE, Reno, USA, Nov. 14-18, 2016, pp. 1-6.

* cited by examiner

METHODS OF WIRELESS DEVICE AND NETWORK NODE, SUCH WIRELESS DEVICE AND NETWORK NODE, AND COMPUTER PROGRAMS THEREOF

RELATED APPLICATIONS

This application is a continuation of U.S. application Ser. No. 17/242,591 filed 28 Apr. 2021, which is a continuation of U.S. application Ser. No. 16/695,794 filed on 26 Nov. 2019, now U.S. Pat. No. 11,019,636, which is a continuation of U.S. application Ser. No. 15/580,307 filed on 7 Dec. 2017, now U.S. Pat. No. 10,524,271, which is a U.S. National Phase Application of PCT/EP2017/077578 filed on 27 Oct. 2017, which claims benefit of Provisional Application No. 62/421,633 filed on 14 Nov. 2016. The entire contents of each aforementioned application is incorporated herein by reference.

TECHNICAL FIELD

The present invention generally relates to methods of wireless device and network node, such wireless device and network node, and computer programs thereof. In particular, the invention relates to monitoring of proper bandwidth for control signals and enabling determination of such proper bandwidth.

BACKGROUND

The current cellular Long Term Evolution (LTE) standard supports flexible bandwidth (BW), from 1.4 MHz up to 20 MHz, and even wider bandwidths using carrier aggregation techniques. In order for a wireless device—e.g., a "UE" in 3GPP parlance—to connect to a network (NW) node, such as an eNodeB or other base station, the wireless device must determine the cell carrier frequency as well as the system bandwidth to use. Furthermore, in current LTE standards there is a requirement that the NW node and the wireless device support and connect using the same system BW. Hence, the wireless device must search for relevant control messages over the entire system BW of the NW.

For the upcoming new radio-access technology in 5G, denoted NR herein, a more generic approach is desirable w.r.t the system bandwidths of respective nodes. NR should support multiple types of wireless devices. A range of device types includes, for example, high-end Mobile Broadband (MBB) devices capable of supporting system BWs up to several GHz, down to low-cost, low-power Machine Type Communication (MTC) devices, which may support BWs of 100 kHz or perhaps a few MHz.

Hence, one of the capabilities desired NR systems is flexibility in allocating "scheduling" BWs to respective wireless device. Here, scheduling BW is the BW determined and signalled by the network node to the wireless device such that the wireless device may apply a receive BW in which it may search for a control channel. In particular, in contrast to prior releases of LTE (and other, earlier-generation network standards), NR systems should have the ability to allocate a "scheduling" bandwidth to any given device that lies anywhere within the overall system BW configured for the supporting NW node. The allocated scheduling bandwidth may equal or be less than the radio receiver BW supported by the device.

eMTC is part of Release 13 by the 3GPP and, among other things, provides for lower bandwidths in the uplink and downlink, lower data rates and reduced transmit power, all benefitting at least certain types of MTC device. While the eMTC enhancements allow for an MTC device to operate on a BW smaller than the system BW of the supporting NW node it connects with, the approach lacks the flexibility needed for NR systems because it is based on using a fixed 1.4 MHz BW.

Hence, it is recognized herein that there remains a need for a method and apparatus to provide the signalling needed between NR networks and the devices operating in them, to support flexible scheduling BW allocations.

SUMMARY

The invention is based on the understanding that power may be saved by avoiding monitoring a wider bandwidth of downlink control signal than necessary.

According to a first aspect, there is provided a method of a wireless device. The method comprises determining a bandwidth for monitoring a downlink control signal, determining a set of possible downlink control indicator. DCI, formats, wherein possible DCI formats are DCI formats compatible with the determined bandwidth, receiving a transmission from a network node, searching for control information in the transmission by decoding using at least one of the DCI formats of the set, and when successful decoding of the control information, performing at least one task associated with the control information.

The decoding using at least one of the DCI formats of the set may comprise attempting to decode control information using one of the DCI formats, if decoding fails, selecting another DCI format from the set and return to attempting to decode the control information, or if decoding is successful, proceeding with the performing of the at least one task.

The set of DCI formats may be acquired from a table based on the determined bandwidth.

The method may comprise determining information about a number of possible Control Channel Elements, CCEs, which are usable for respective DCI format of the set, wherein the information about the number of possible CCEs is used for the decoding.

A first set of DCI formats for a first bandwidth may comprise DCI formats holding a first amount of information, and a second set of DCI formats for a second bandwidth may comprise DCI formats holding a second amount of information, wherein the second bandwidth is wider than the first bandwidth, and the second amount of information comprises information which is not a part of the first amount of information. The information which is part of the second amount of information but not part of the first amount of information may comprise any of a number of multiple-input-multiple-output. MIMO, layers above a first threshold, a more complex MIMO configuration which requires more bits than for a configuration for the first bandwidth, a modulation and coding scheme above a second threshold, a code rate above a third threshold, and a resource block allocation pointing to resource blocks outside the first bandwidth.

The determining of the bandwidth for monitoring may be based on a previous or anterior used DCI. The previous or anterior DCI may comprise explicit information about bandwidth to be used in consecutive transmission. The explicit information may comprise one or more bits indicating the bandwidth for monitoring the downlink control signal. The determining of the bandwidth for monitoring may be implicitly determined as a bandwidth associated with the previous or anterior DCI.

The determining of the bandwidth for monitoring may include, when operating in a wider bandwidth for monitoring, resetting a timer when a resource allocation reaches an allocation threshold, and then when the timer elapses, determining the bandwidth for monitoring to be a narrower bandwidth. The resetting of the timer may include setting and starting the timer.

According to a second aspect, there is provided a wireless device arranged to perform the method of the first aspect.

According to a third aspect, there is provided a computer program comprising instructions which, when executed by a processor of a wireless device, causes the wireless device to perform the method according to the first aspect.

According to a fourth aspect, there is provided a method of a network node. The method comprises configuring a downlink bandwidth to be used at downlink transmissions, determining a DCI format based on the downlink bandwidth, and transmitting control information using a DCI with the determined DCI format.

A first set of DCI formats for a first bandwidth may comprise DCI formats holding a first amount of information, and a second set of DCI formats for a second bandwidth may comprise DCI formats holding a second amount of information, wherein the second bandwidth is wider than the first bandwidth, and the second amount of information comprises information which is not a part of the first amount of information. The information which is part of the second amount of information but not part of the first amount of information may comprise any of a number of multiple-input-multiple-output, MIMO, layers above a first threshold, a modulation and coding scheme above a second threshold, a code rate above a third threshold, and a resource block allocation pointing to resource blocks outside the first bandwidth.

The bandwidth for monitoring may be indicated in a previous or anterior DCI. The previous or anterior DCI may comprise explicit information about bandwidth to be used in consecutive transmission. The explicit information may comprise one or more bits indicating the bandwidth for monitoring the downlink control signal. The bandwidth may be implicitly indicated as a bandwidth associated with the previous or anterior DCI unless explicitly indicated otherwise.

The determining of the bandwidth for monitoring may include resetting, when operating in a wider bandwidth for monitoring, a timer when a resource allocation reaches an allocation threshold, and then, when the timer elapses, configuring the bandwidth for monitoring to be a narrower bandwidth. The resetting of the timer may include setting and starting the timer.

According to a fifth aspect, there is provided a network node of a radio access network arranged to perform the method of the fourth aspect.

According to a sixth aspect, there is provided a computer program comprising instructions which, when executed by a processor of a network node, causes the network node to perform the method according to the fourth aspect.

BRIEF DESCRIPTION OF THE DRAWINGS

The above, as well as additional objects, features and advantages of the present invention, will be better understood through the following illustrative and non-limiting detailed description of preferred embodiments of the present invention, with reference to the appended drawings.

DETAILED DESCRIPTION

Figure 1:
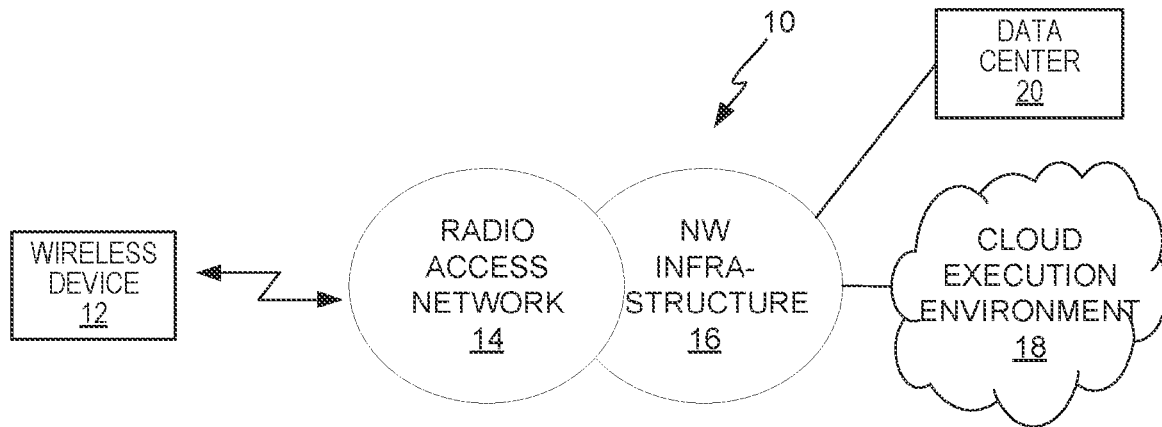
FIG. 1 is a block diagram of one embodiment of a wireless communication network configured according to the teachings herein.

FIG. 1 depicts an example embodiment of a wireless communication network 10 that is configured to communicatively couple to a wireless device 12, to provide one or more communication services to the wireless device 12. By way of example, the wireless communication network 10 ("network 10") provides Internet or other packet-data connectivity for the wireless device 12. More particularly, the network 10 and the wireless device 12 operate according to the flexible scheduling bandwidth allocations and power-efficient operations described herein.

According to the simplified depiction given in FIG. 1, the network 10 includes a Radio Access Network (RAN) 14 and associated network (NW) infrastructure 16. The NW infrastructure includes, for example, data processing, switching, and storage functions, along with providing mobility management and routing interfaces into and out of the RAN 14. The network infrastructure 16 may communicatively couple to a cloud execution environment 18—e.g., providing one or more Network Functions (NFs) or application services—and may also couple to one or more data centres 20. Further, there may be more than one RAN 14, and more than one type of Radio Access Technology (RAT) involved.

In some embodiments, the network 10 comprises a so-called "5G" network, also referred to herein as a "NR" network or system, where "NR" denotes "New Radio." According to one contemplated implementation, the network 10 represents an evolution of LTE for existing spectrum in combination with new radio access technologies that primarily target new spectrum. Among its key technology components, the network 10 in a 5G implementation includes access/backhaul integration, device-to-device communication, flexible duplex, flexible spectrum usage, multi-antenna transmission, ultra-lean design, and user/control data separation. Here, ultra-lean design refers to the minimization of any transmissions not directly related to the delivery of user data, and the RAN 14 may be configured to rely heavily on beamforming for the delivery of user data via one or more narrow, dynamically allocable antenna beams.

Other points of flexibility and breadth apply to the wireless device 12 ("device 12"). Firstly, the network 10 may support potentially many devices 12, and the various devices 12 may be of different types and may be engaged in different types of communication services. For example, a device 12 configured for Mobile BroadBand (MBB) services may be used by a person to access movies, music, and other multimedia content delivered through the network 10. On the other hand, a device 12 configured for embedded operation may not include any user interface, and may engage only in low-power, low-rate Machine Type Communication (MTC) transmissions or receptions. Thus, by way of example rather than limitation, the device 12 may be a smartphone, a feature phone, a sensor, an actuator, a wireless modem or other wireless network adaptor, a laptop computer, a tablet or other mobile computing device, or essentially any other wireless communication apparatus configured for accessing the network 10 and operating according to any one or more of the RATs supported by the network 10. Still further, the device 12 may be a mobile device or may be installed or operated in a fixed location.

Figure 2:
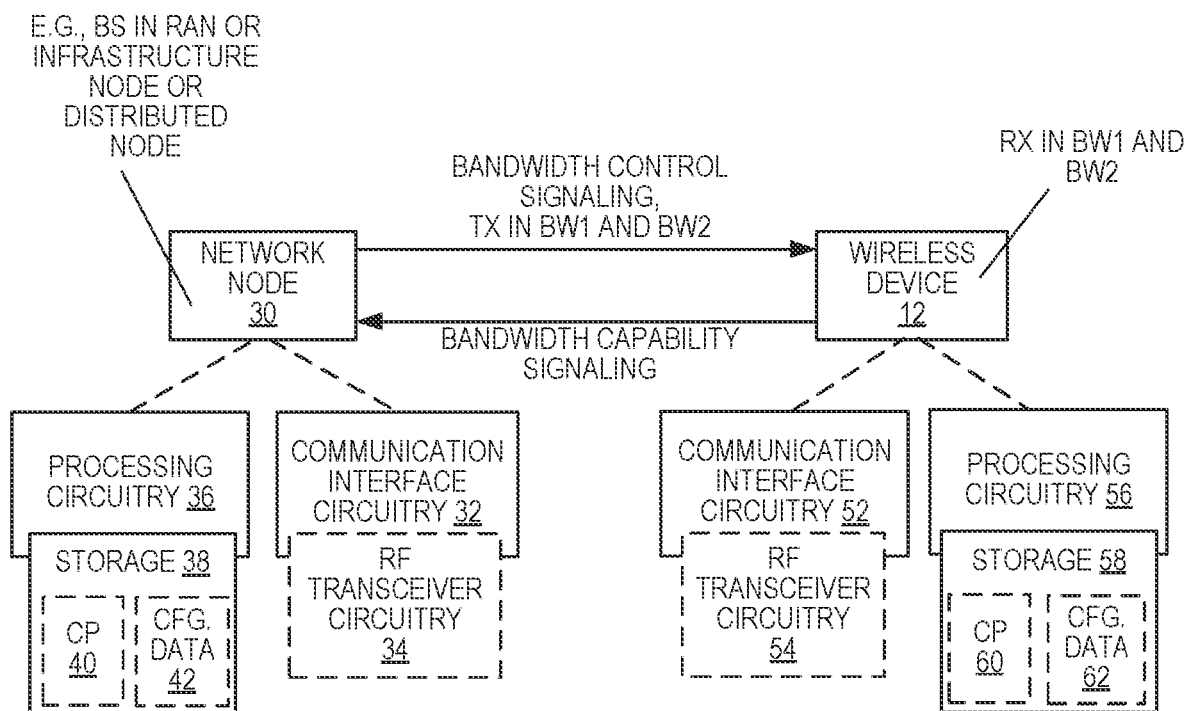
FIG. 2 is a block diagram of example details for a network node and a wireless device configured for operation in a wireless communication network.

FIG. 2 depicts example implementation details for the device 12 and for a network node 30 that is configured to support network-side aspects of the teachings herein. The network node 30 includes communication interface circuitry 32, which in turn includes radio frequency transceiver circuitry 34—i.e., one or more radio frequency transmitter and receiver circuits—for wireless communicating with one or more devices 12, according to one or more RATs. Further, in at least one embodiment, the communication interface circuitry 32 includes one or more network interfaces—e.g., Ethernet or other intra-node interface—for communication with one or more other nodes in the network 10 and may not have radio frequency circuitry. In such embodiments, the network node 30 may communicate indirectly with the device 12, e.g., through another node that has radio frequency circuitry.

The network node 30 also includes processing circuitry 36 that is operatively associated with the communication circuitry 32. The processing circuitry 36 comprises programmed circuitry or fixed circuitry, or a combination of programmed and fixed circuitry. In an example embodiment, the processing circuitry 36 comprises one or more microprocessors. Digital Signal Processors (DSPs). Field Programmable Gate Arrays (FPGAs), Application Specific Integrated Circuits (ASICs), or other digital processing circuits.

In at least one embodiment, the processing circuitry 36 is configured at least in part based on its execution of computer instructions included in one or more computer programs 40 stored in storage 38 in the network node 30. The storage 38 may also store one or more items of configuration data 42 associated with operation of the network node 30 according to the teachings herein. The storage 38 comprises, for example, one or more types of computer-readable media, such as Solid State Disk (SSD), FLASH, DRAM, SRAM, etc. In one embodiment, the storage 38 provides for long-term storage of the computer program(s) 40, and further provides working memory for operation of the processing circuitry 36.

FIG. 2 also provides example implementation details for the device 12. The device 12 includes communication interface circuitry 52, which in turn includes radio frequency transceiver circuitry 54—i.e., one or more radio frequency transmitter and receiver circuits—for wireless communicating with the network 10, according to one or more RATs.

The device 12 also includes processing circuitry 56 that is operatively associated with the communication circuitry 52. The processing circuitry 56 comprises programmed circuitry or fixed circuitry, or a combination of programmed and fixed circuitry. In an example embodiment, the processing circuitry 56 comprises one or more microprocessors, Digital Signal Processors (DSPs), Field Programmable Gate Arrays (FPGAs), Application Specific Integrated Circuits (ASICs), or other digital processing circuits.

In at least one embodiment, the processing circuitry 56 is configured at least in part based on its execution of computer instructions included in one or more computer programs 60 stored in storage 58 in the device 12. The storage 58 may also store one or more items of configuration data 62 associated with operation of the device 12 according to the teachings herein. The storage 58 comprises, for example, one or more types of computer-readable media, such as Solid State Disk (SSD), FLASH, DRAM, SRAM, etc. In one embodiment, the storage 58 provides for long-term storage of the computer program(s) 60, and further provides working memory for operation of the processing circuitry 56.

With the above in mind, the network node 30 may be configured to send or initiate the sending of signalling indicating or configuring the scheduling bandwidth (BW) for given wireless devices 12. The network node 30 may further be configured to signal changes in the scheduling BW, and to indicate, for example, first and second receiver BWs to be used by a device 12 for signal reception. As an example, the network node 30 indicates a first receiver BW to be used by a device 12, and then subsequently indicates a second receiver BW to be used by the device 12. The indications may be explicit and/or implicit, as will be discussed below. Furthermore, as also will be discussed below, the BW used by the UE for monitoring control signals from the network node is intended to be adapted accordingly to avoid consuming unnecessary power by monitoring a too wide BW.

Still further, the network node 30, or another entity in the network, may be configured to determine timer parameters needed for controlling the BW configuration changes at the device 12, e.g., for changing from the first receiver BW to the second receiver BW, or from the second receiver BW back to the first receiver BW. Here, the terms "receiver BW" and "scheduling BW" are used. The scheduling BW is set by the NW node and signalled to the wireless device. The wireless device sets its receiver BW based on the scheduling BW, e.g., to the same BW. These BWs may be denoted as a number of resource blocks which the wireless device scans for a control channel. It is also contemplated to configure or otherwise indicate timer parameters to be used for receiver BW configuration changes at the device 12 when DRX mode is active.

Complementing these aspects of the disclosed teachings, the device 12 may be configured to use the configuration parameters to reduce receiver power consumption. In particular, the device 12 reduces its receiver power consumption by only using sufficient receiver BW for reception of data and/or Layer 1/Layer 2 control, based on the current user scenario and device needs. Here, a user scenario may be that one or more communication sessions are ongoing, the nature of communication session(s), etc. The nature of a communication session may comprise size, e.g., whether it comprises only a notification or if it comprises a media stream, latency requirements, differentiation between types of transmitted information, etc. Device needs may for example comprise power consumption, processing power, RF capabilities, battery status, etc.

In one example scenario, the device 12 operates with a first receiver BW and then reconfigures to a wider, second receiver BW, e.g., responsive to signalling from the network 10. The device 12 may be reconfigured to the second BW to facilitate the transmission of a larger amount of data or higher-rate data to the device 12, as compared to what could be supported using the first receiver BW. Advantageously, when operation returns to data traffic according to the first BW after a transmission on the second BW is that some packets, which may arrive slightly later, e.g., due to some media protocol, than the data requiring the second BW, can be handled when transition has been made to operate at the first BW, and thus at lower power or capacity consumption. In particular, these packets may be handled before a DRX timer elapses, wherein the limited capacity when operating with the first BW is proper for that handling. Furthermore, if both high-demand sessions and low-demand sessions are performed simultaneously, transition to operation of the low-demand sessions will be smoother. An advantage is further that resources are saved when transmissions are limited in both BW and time.

Given the general mechanisms of using different BWs and signalling related to that, as demonstrated above, this disclosure will now focus on BW used for monitoring and searching for a control channel. An aim is to be able to do monitoring and search using a smaller BW receiver, and thereby reduce power consumption, when that is feasible in view of required operation. That is, a larger BW reception for the monitoring and search may be used when that is beneficial but is avoided otherwise. To accomplish this, there is a need for an approach of adapting control signalling format.

Consider a UE (device, smartphone, IoT/MTC device, modem, laptop, tablet computer, etc.) is operating in a mode where the UE can be configured with at least a first narrowband downlink (DL) monitoring BW and a second wideband DL monitoring BW. In the configured BW, the UE monitors for reception of control and data information, and within a control channel a Downlink Control indicator (DCI) may be transmitted to the UE, where the DCI includes information relevant for further DL processing of data, such as resource block (RB) allocation in Physical Downlink Shared Channel (PDSCH), Multiple-Input-Multiple-Output (MIMO) state, hybrid-ARQ (Automatic Repeat reQuest) parameters, modulation and coding scheme (MCS), etc., as well as uplink (UL) transmission of data, such as RB allocation, MIMO state, hybrid-ARQ parameters, MCS, etc. An applied DCI format is one of a set of allowed DCI formats, indicating payload size, content, usage, etc., which set may be different depending on the configured DL monitoring BW, and may be defined by a standard associated to the applied communication, i.e., related to the used Radio Access Technology, for instance the NR standard. From these limitations, an implicit signalling from a network node to a UE may provide a very slim approach of signalling due to the very limited overhead. That is, a network node of an access network, where the network node is serving the UE, configures a DL scheduling (or monitoring) BW to be used. This may for example be made based on service to be provided, on amount of data present in transmit data buffer, on traffic history, on data type, etc. Based on the configured DL BW, the network node determines a set of DCI formats which is feasible to use. When data is to be sent to the UE, the network node transmits control information to the UE using one of the DCI formats of the determined set such that the UE then can receive/transmit data according to the DCI setting. Ways of accomplishing these approaches for the UE and the network node will be demonstrated with reference to FIGS. 3 and 4 below.

Figure 3:
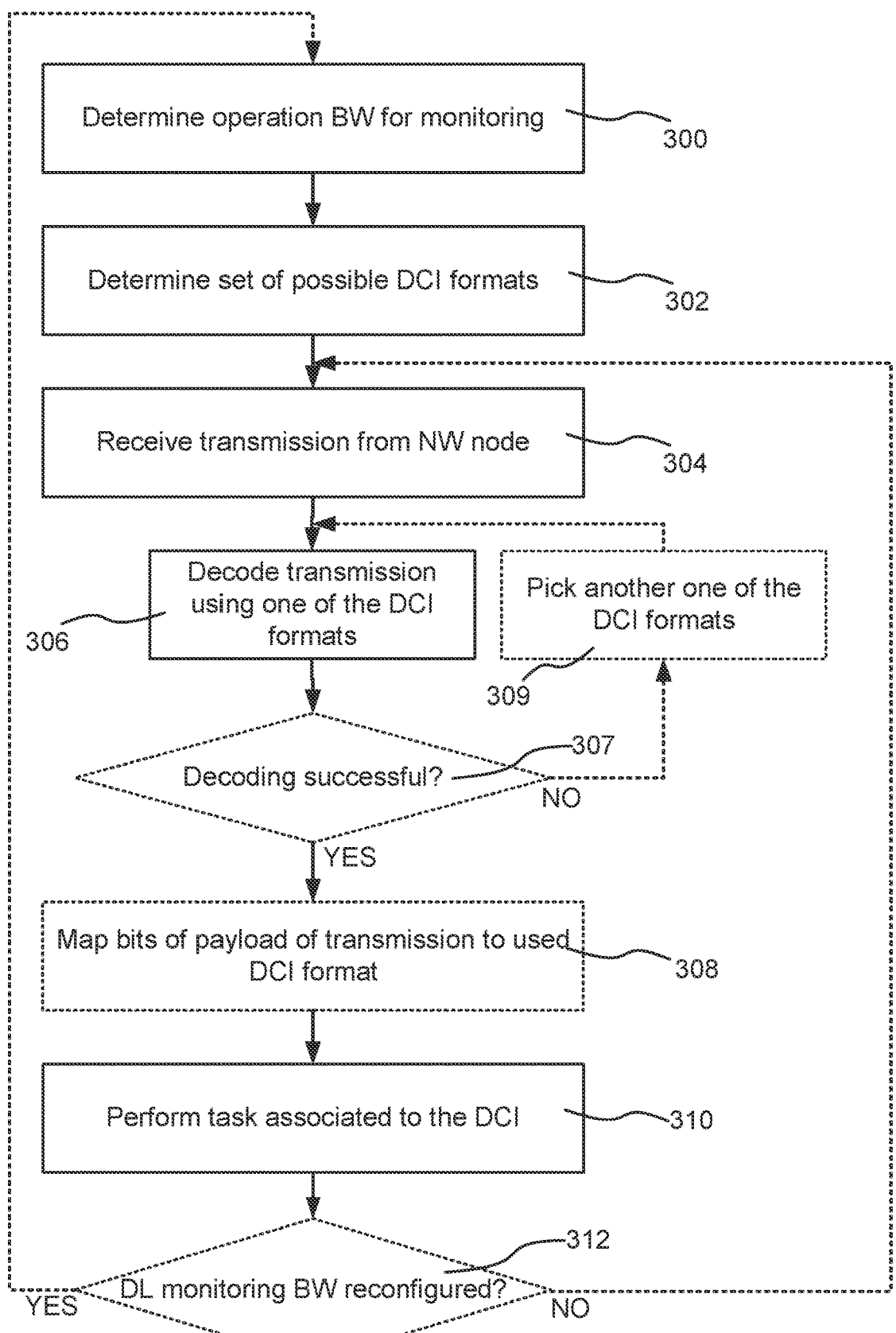
FIG. 3 is a flow chart schematically illustrating a method of a wireless device of an access network according to embodiments.

FIG. 3 is a flow chart schematically illustrating a method of a wireless device. The method comprises determining 300 a bandwidth for monitoring a downlink control signal. The determining 300 of the bandwidth for monitoring may be based on a previous or anterior used DCI. For example, the previous or anterior DCI may comprise explicit information about bandwidth to be used in consecutive transmission, wherein the wireless device will know which bandwidth to apply. Another example is that the determining of the bandwidth may be implicitly assumed, when no other information is available indicating the contrary, to be a bandwidth associated with the previous or anterior DCI, i.e., a bandwidth suitable or used therewith. The determining of the bandwidth may also include resetting a timer when a resource allocation reaches an allocation threshold, wherein the allocation threshold may be that a certain time has passed without indications on use of the wider BW. Thus, a timer may be set at each indication that the wider BW is applied, and when the timer elapses the resource allocation is considered to go below the allocation threshold, and the UE returns to monitoring a narrower BW. Here, for the sake of brevity, the terms BW and bandwidth are used for downlink (DL) monitoring BW unless otherwise specified. The DL monitoring BW is a bandwidth for monitoring a downlink control signal.

The method further comprises determining 302 a set of possible downlink control information, DCI, formats. Here, possible DCI formats are DCI formats compatible with the determined bandwidth. The set of DCI formats can for example be acquired from a table based on the determined bandwidth, i.e., the table comprises feasible mappings between DCI formats and bandwidths. For example, a first set of DCI formats for a first bandwidth may comprise DCI formats holding a first amount of information, and a second set of DCI formats for a second bandwidth may comprise DCI formats holding a second amount of information. The second bandwidth is here considered to be wider than the first bandwidth, and the second amount of information comprises information which is not a part of the first amount of information. Thus, the wider bandwidth may demand DCI formats holding more information. More information in this sense may for example be any of, or any combination of, a number of multiple-input-multiple-output, MIMO, layers above a first threshold, a modulation and coding scheme above a second threshold, a code rate above a third threshold, a resource block allocation pointing to resource blocks outside the first bandwidth, etc.

The method further comprises receiving 304 a transmission from a network node. Here, the reception may comprise control information which the wireless device desires to acquire. Thus, the method includes searching for control information in the transmission by decoding 306 using at least one of the DCI formats of the set. For example, the decoding may include attempting to decode control information using one of the DCIs, wherein the one of the DCIs may be selected using one or another method, e.g., based on historical information, likelihood calculations, randomly, in a fixed order, etc. An approach is to determine information about a number of possible Control Channel Elements, CCEs, which are usable for respective DCI format of the set, wherein the information about the number of possible CCEs is used for the decoding. It is then checked 307 if the decoding was successful. If decoding fails, the procedure continues with selecting 309 another DCI from the set and return to attempting to decode the control information. If decoding is successful, the method proceeds as demonstrated below.

When successful decoding of the control information has been accomplished, the method may include mapping 308 bits of payload of the transmission to the successfully used DCI format, and the method proceeds with performing 310 at least one task associated with the control information. That is, the wireless device has now acquired the desired control information and can act thereon.

When successful decoding has been accomplished, the wireless device is able to gain information from the control information. As discussed above, one part of the information may be about coming bandwidth configuration. Therefore, the method may include checking 312 whether bandwidth to be monitored is indicated to be changed. If no change in bandwidth is in forecast, the wireless device may proceed with receiving 304 a next transmission using the same parameters again. However, if a change in bandwidth is indicated, the procedure starts all over again with determining 300 operation bandwidth for the monitoring.

In some embodiments, a blind decoding search is performed where the wireless device blindly tries to decode the control channel, e.g., PDCCH, by assuming the set of possible DCI formats allowed for the DL monitoring BW, possible in combination with possible code rates to be used for respective DCI format. In some embodiments, this is related to the number of possible CCEs that can be combined, i.e., aggregation levels, allowed which in LTE may be 1, 2, 4 or 8. If a successful decoding is not determined the UE changes the DCI format hypothesis/aggregation level/start position of the decoding and make a new try until all hypotheses are tried. In some embodiments, the UE searches until it finds a valid DCI, or all possibilities have been exhausted, i.e., at most one valid DCI can be found. In another embodiment, the wireless device trying all hypotheses and may find more than one valid DCI, e.g., one DL assignment and one UL grant. If successful coding is accomplished, the wireless device then maps the bits in payload to the determined DCI format/DCI formats, e.g., look up-table which may be based on specifications for the radio access technology used, and can interpret the bits and hence perform the task associated to the determined. The wireless device then continues to monitor the DL CCHs for information, and once information, which may be implicit or explicit as discussed above, indicates a need for change of the DL monitoring BW, the UE replaces the set of allowed DCI formats to the DCI formats allowed by the new configured DL monitoring BW. Optionally, the UE may also change DL monitoring BW so that the wide BW is applied all the time. In another embodiment, other triggers for changing the monitoring BW are possible, e.g., a separate channel or maybe some periodic timer indicating when the UE should change the DL monitoring BW. One example is that the change indication from narrowband to wideband DL monitoring BW could be an explicit bit, while the falling back to the narrowband DL monitoring bandwidth could be done via timers.

The set of DCI formats for the wide BW case does not necessarily imply a large DCI size. One could in some embodiment envision the same DCI size both for narrow and wide BW but in case of wide BW the RB allocation is based on larger groups of RBs than in the former case, i.e. for narrow BW each bit in a resource bitmap corresponds to a certain amount of RBs, in the wideband case each bit corresponds to a larger amount of RBs, and similarly for other ways of signalling RB allocations. That is, trading resolution for BW may be performed when entering a wideband mode.

In the discussion above, for the sake of easier understanding, the explanation has been based on that there is a narrower BW and a wider BW. However, the principle is applicable to three or more different BWs using the same approach as demonstrated above. Thus, the wireless device will then determine which of the BWs to use for monitoring a control channel. The determination may for example be based on a bit pattern.

Figure 4:
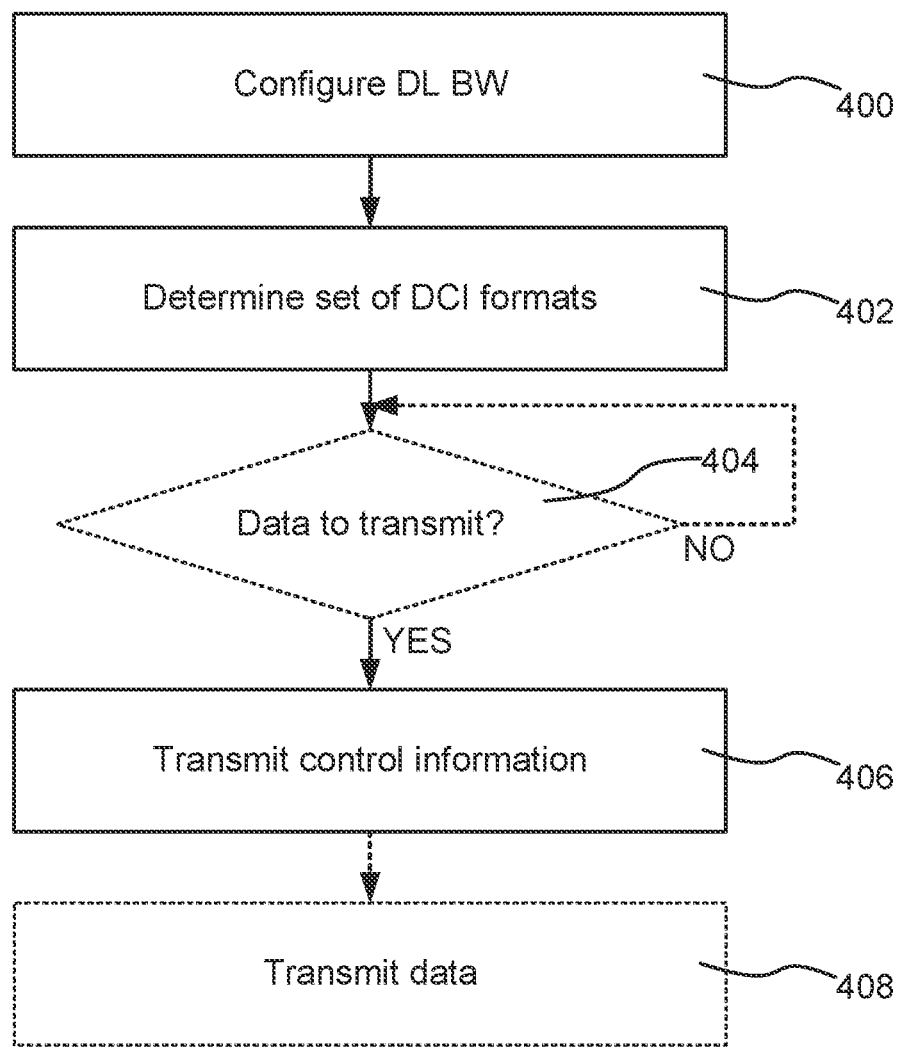
FIG. 4 is a flow chart schematically illustrating a method of a network node according to embodiments.

FIG. 4 is a flow chart schematically illustrating a method of a network node of a radio access network. The method comprises configuring 400 a downlink bandwidth to be used at downlink transmissions and determining 402 a DCI format based on the downlink bandwidth. Here, the appropriate DCI format is as discussed above. Thus, a first set of DCI formats for a first bandwidth may comprise DCI formats holding a first amount of information, and a second set of DCI formats for a second bandwidth may comprise DCI formats holding a second amount of information. The second bandwidth is here wider than the first bandwidth, and the second amount of information then comprises information which is not a part of the first amount of information. The information which is part of the second amount of information but not part of the first amount of information can for example comprises any of a number of multiple-input-multiple-output, MIMO, layers above a first threshold, a modulation and coding scheme above a second threshold, a code rate above a third threshold, a resource block allocation pointing to resource blocks outside the first bandwidth, etc.

A check 404 on whether there is data to transmit may be performed before transmitting 406 control information using a DCI with the determined DCI format. The check 404 may as well be performed before the configuration 400 of the bandwidth, wherein the amount, type, etc. of data may be taken into account when determining the appropriate bandwidth.

As control information has been transmitted 406, a proper connection is assumed to be up and running, wherein the method may proceed with transmitting 408 data.

The network (NW) node, e.g., gNodeB, is serving a UE, the UE having capability to be configured with at least a first narrowband DL monitoring BW and a wideband DL monitoring BW, as has been described in detail above. The NW node starts to configure the DL monitoring BW according to the current need, which may be signalled from the UE or based on for example the amount of data waiting in the buffers for said UE, the past traffic history of said UE, the type of data, e.g., latency-critical or not, to be transmitted to said UE, etc. Based on the configured DL monitoring BW the NW node determines the set of DCI formats that can be used. For instance, in case a wideband DL monitoring BW is configured, the NW node needs to be able to point to a larger number of possible RBs the data can be scheduled on, for example a larger bit map implies a larger DCI payload, similarly also for other schemes such as signalling starting point and length of the allocation, compared to when a narrowband DL monitoring BW is used. Furthermore, since narrowband DL monitoring BW is mainly for power saving purposes, fewer MIMO-layers/antenna ports may be allowed, meaning fewer number of bits needed in the DCI to point out the currently used MIMO configuration compared to if the high throughput wideband DL monitoring BW is used, etc.

In other embodiments, also number of possible modulation schemes, code rate, etc. (MCS) to use may be different and hence also number of bits for representing the chosen MCS. In other embodiments, one could have different possibilities in terms of cross-slot scheduling, both for DL and UL, depending on narrowband/wideband PDCCH. In yet another embodiment different number of bits to indicate the monitoring BW in the future, for instance narrow BW needs a bit to switch to wide BW, but maybe no bit for switching back is needed in a timer embodiment as described above. The scheduler then monitors if there is any data to be scheduled to the UE, and if so, the NW node determines data allocation in the PDSCH, MIMO scheme to use etc. and configures the needed DCI and transmit control information according to the determined need.

Figure 5:
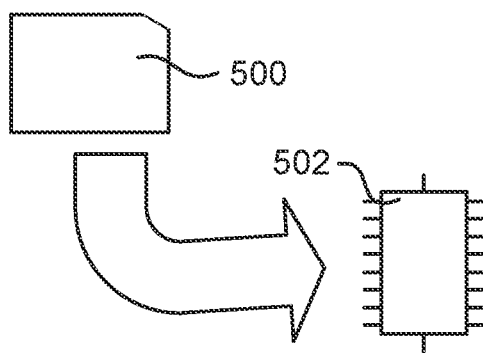
FIG. 5 schematically illustrates a computer-readable medium and a processing device.

The methods according to the present invention are suitable for implementation with aid of processing means, such as computers and/or processors, especially for the case where the processing elements 36 and 56 demonstrated above comprises a processor 40, 60 handling and/or controlling actions of the respective methods. Therefore, there are provided computer programs, comprising instructions arranged to cause the processing means, processor, or computer to perform the steps of any of the methods according to any of the embodiments described with reference to FIGS. 3 and 4, respectively. The computer programs preferably comprise program code which is stored on a computer readable medium 500, as illustrated in FIG. 5, which can be loaded and executed by a processing means, processor, or computer 502 to cause it to perform the methods, respectively, according to embodiments of the present invention, preferably as any of the embodiments described with reference to FIGS. 3 and 4. The computer 502 and computer program product 500 can be arranged to execute the program code sequentially where actions of the any of the methods are performed stepwise, or be arranged to perform the actions on a real-time basis. The processing means, processor, or computer 502 is preferably what normally is referred to as an embedded system. Thus, the depicted computer readable medium 500 and computer 502 in FIG. 5 should be construed to be for illustrative purposes only to provide understanding of the principle, and not to be construed as any direct illustration of the elements.

Figure 6:
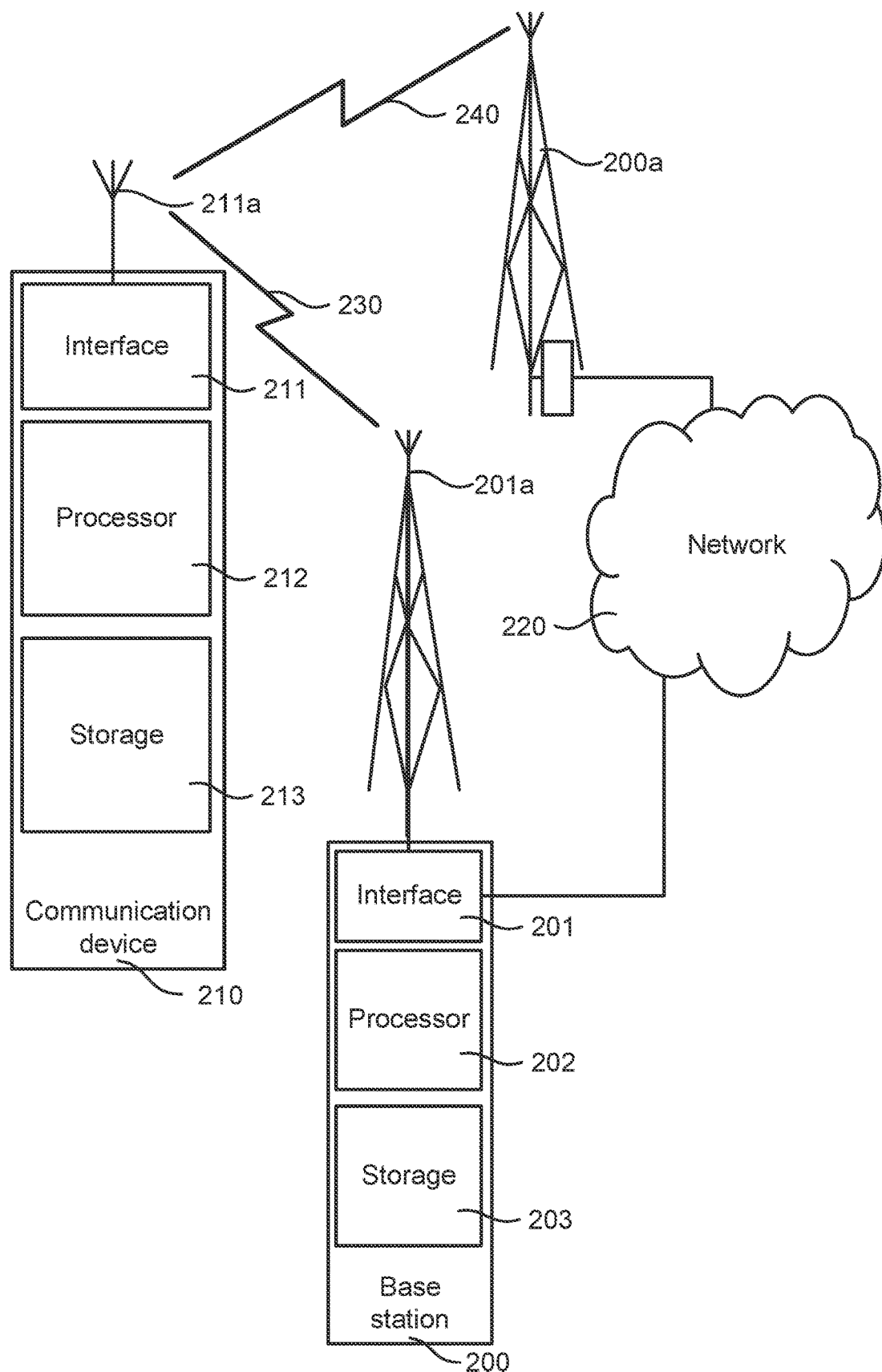
FIG. 6 illustrates a wireless network comprising a network node and a communication device.

FIG. 6 illustrates a wireless network comprising a more detailed view of a network node 200 and a communication device 210, in accordance with an embodiment. For simplicity, FIG. 6 only depicts network 220, network nodes 200 and 200a, and communication device 210. Network node 200 comprises processor 202, storage 203, interface 201, and antenna 201a. Similarly, the communication device 210 comprises processor 212, storage 213, interface 211 and antenna 211a. These components may work together in order to provide network node and/or wireless device functionality. In different embodiments, the wireless network may comprise any number of wired or wireless networks, network nodes, base stations, controllers, wireless devices, relay stations, and/or any other components that may facilitate or participate in the communication of data and/or signals whether via wired or wireless connections.

Network 220 may comprise one or more IP networks, public switched telephone networks (PSTNs), packet data networks, optical networks, wide area networks (WANs), local area networks (LANs), wireless local area networks (WLANs), wired networks, wireless networks, metropolitan area networks, and other networks to enable communication between devices.

Network node 200 comprises processor 202, storage 203, interface 201, and antenna 201a. These components are depicted as single boxes located within a single larger box. In practice however, a network node may comprise multiple different physical components that make up a single illustrated component (e.g., interface 201 may comprise terminals for coupling wires for a wired connection and a radio transceiver for a wireless connection). Similarly, network node 200 may be composed of multiple physically separate components (e.g., a NodeB component and a RNC component, a BTS component and a BSC component, etc.), which may each have their own respective processor, storage, and interface components. In certain scenarios in which network node 200 comprises multiple separate components (e.g., BTS and BSC components), one or more of the separate components may be shared among several network nodes. For example, a single RNC may control multiple NodeBs. In such a scenario, each unique NodeB and BSC pair, may be a separate network node. In some embodiments, network node 200 may be configured to support multiple radio access technologies (RATs). In such embodiments, some components may be duplicated (e.g., separate storage 203 for the different RATs) and some components may be reused (e.g., the same antenna 201a may be shared by the RATs).

Processor 202 may be a combination of one or more of a microprocessor, controller, microcontroller, central processing unit, digital signal processor, application specific integrated circuit, field programmable gate array, or any other suitable computing device, resource, or combination of hardware, software and/or encoded logic operable to provide, either alone or in conjunction with other network node 200 components, such as storage 203, network node 200 functionality. For example, processor 202 may execute instructions stored in storage 203. Such functionality may include providing various wireless features discussed herein to a wireless device, such as WD 210, including any of the features or benefits disclosed herein.

Storage 203 may comprise any form of volatile or non-volatile computer readable memory including, without limitation, persistent storage, solid state memory, remotely mounted memory, magnetic media, optical media, random access memory (RAM), read-only memory (ROM), removable media, or any other suitable local or remote memory component. Storage 203 may store any suitable instructions, data, or information, including software and encoded logic, utilized by network node 200. Storage 203 may be used to store any calculations made by processor 202 and/or any data received via interface 201.

Network node 200 also comprises interface 201 which may be used in the wired or wireless communication of signalling and/or data between network node 200, network 220, and/or WD 210. For example, interface 201 may perform any formatting, coding, or translating that may be needed to allow network node 200 to send and receive data from network 220 over a wired connection. Interface 201 may also include a radio transmitter and/or receiver that may be coupled to or a part of antenna 201a. The radio may receive digital data that is to be sent out to other network nodes or WDs via a wireless connection. The radio may convert the digital data into a radio signal having the appropriate channel and bandwidth parameters. The radio signal may then be transmitted via antenna 201a to the appropriate recipient (e.g., WD 210).

Antenna 201a may be any type of antenna capable of transmitting and receiving data and/or signals wirelessly. In some embodiments, antenna 201a may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, a panel antenna may be a line of sight antenna used to transmit/receive radio signals in a relatively straight line, and an array of antenna elements may be used for providing a beamforming transmission and/or reception pattern.

WD 210 may be any type of communication device, wireless device, UE, D2D device or ProSe UE, but may in general be any device, sensor, actuator, smart phone, modem, laptop. Personal Digital Assistant (PDA), tablet, mobile terminal, smart phone, laptop embedded equipped (LEE), laptop mounted equipment (LME), Universal Serial Bus (USB) dongles, machine type UE, U E capable of machine to machine (M2M) communication, etc., which is able to wirelessly send and receive data and/or signals to and from a network node, such as network node 200 and/or other WDs. WD 210 comprises processor 212, storage 213, interface 211, and antenna 211a. Like network node 200, the components of WD 210 are depicted as single boxes located within a single larger box, however in practice a wireless device may comprises multiple different physical components that make up a single illustrated component (e.g., storage 213 may comprise multiple discrete microchips, each microchip representing a portion of the total storage capacity).

Processor 212 may be a combination of one or more of a microprocessor, controller, microcontroller, central processing unit, digital signal processor, application specific integrated circuit, field programmable gate array, or any other suitable computing device, resource, or combination of hardware, software and/or encoded logic operable to provide, either alone or in combination with other WD 210 components, such as storage 213, WD 210 functionality. Such functionality may include providing various wireless features discussed herein, including any of the features or benefits disclosed herein.

Storage 213 may be any form of volatile or non-volatile memory including, without limitation, persistent storage, solid state memory, remotely mounted memory, magnetic media, optical media, random access memory (RAM), read-only memory (ROM), removable media, or any other suitable local or remote memory component. Storage 213 may store any suitable data, instructions, or information, including software and encoded logic, utilized by WD 210. Storage 213 may be used to store any calculations made by processor 212 and/or any data received via interface 211.

Interface 211 may be used in the wireless communication of signalling and/or data between WD 210 and network node 200. For example, interface 211 may perform any formatting, coding, or translating that may be needed to allow WD 210 to send and receive data from network node 200 over a wireless connection. Interface 211 may also include a radio transmitter and/or receiver that may be coupled to or a part of antenna 211a. The radio may receive digital data that is to be sent out to network node 200 via a wireless connection. The radio may convert the digital data into a radio signal having the appropriate channel and bandwidth parameters. The radio signal may then be transmitted via antenna 211a to network node 200.

Antenna 211a may be any type of antenna capable of transmitting and receiving data and/or signals wirelessly. In some embodiments, antenna 211a may comprise one or more omni-directional, sector or panel antennas operable to transmit/receive radio signals between 2 GHz and 66 GHz. For simplicity, antenna 211a may be considered a part of interface 211 to the extent that a wireless signal is being used.

In some embodiments, the components described above may be used to implement one or more functional modules used in D2D communication. The functional modules may comprise software, computer programs, sub-routines, libraries, source code, or any other form of executable instructions that are run by, for example, a processor. In general terms, each functional module may be implemented in hardware and/or in software. Preferably, one or more or all functional modules may be implemented by processors 212 and/or 202, possibly in cooperation with storage 213 and/or 203. Processors 212 and/or 202 and storage 213 and/or 203 may thus be arranged to allow processors 212 and/or 202 to fetch instructions from storage 213 and/or 203 and execute the fetched instructions to allow the respective functional module to perform any features or functions disclosed herein. The modules may further be configured to perform other functions or steps not explicitly described herein but which would be within the knowledge of a person skilled in the art.

Certain aspects of the inventive concept have mainly been described above with reference to a few embodiments. However, as is readily appreciated by a person skilled in the art, embodiments other than the ones disclosed above are equally possible and within the scope of the inventive concept. Similarly, while a number of different combinations have been discussed, all possible combinations have not been disclosed. One skilled in the art would appreciate that other combinations exist and are within the scope of the inventive concept. Moreover, as is understood by the skilled person, the herein disclosed embodiments are as such applicable also to other standards and communication systems and any feature from a particular figure disclosed in connection with other features may be applicable to any other figure and or combined with different features.

What is claimed is:

1. A method of a network node, the method comprising:
configuring a first downlink bandwidth to be used for downlink transmissions;
transmitting control information using the first downlink bandwidth and a first downlink control indicator (DCI), with a first DCI format based on the first downlink bandwidth;
determining a need to change from the first downlink bandwidth to a second downlink bandwidth to facilitate downlink transmission of a larger amount of data or higher-rate data than that supportable by the first downlink bandwidth, wherein the second downlink bandwidth is wider than the first bandwidth; and
upon change to the second downlink bandwidth to be used for downlink transmissions, transmitting further control information using the first downlink bandwidth and a second DCI, with a second DCI format based on the second downlink bandwidth.

2. The method of claim 1, wherein the first downlink bandwidth is indicated in a previous or anterior DCI transmitted by the network node.

3. The method of claim 2, wherein the previous or anterior DCI comprises explicit information about the downlink bandwidth to be used in consecutive transmissions.

4. The method of claim 3, wherein the explicit information comprises one or more bits indicating the downlink bandwidth to monitor for downlink control signals.

5. The method of claim 2, wherein the first downlink bandwidth is implicitly indicated as a bandwidth associated with the previous or anterior DCI, unless explicitly indicated otherwise.

6. The method of claim 1, wherein the method includes:
starting a timer upon the change to the second bandwidth and while using the second downlink bandwidth, resetting the timer responsive to a resource allocation in the second downlink bandwidth reaching an allocation threshold; and
changing back to using the first bandwidth upon expiration of the timer.

7. The method of claim 6, wherein the resetting of the timer comprises restarting the timer.

8. A network node configured for operation in a radio access network, the network node comprising:
communication interface circuitry; and
processing circuitry configured to:
configure a first downlink bandwidth to be used for downlink transmissions;
transmit control information via the communication interface circuitry, the control information transmitted using the first downlink bandwidth and a first downlink control indicator (DCI), with a first DCI format based on the first downlink bandwidth;

determine a need to change from the first downlink bandwidth to a second downlink bandwidth to facilitate downlink transmission of a larger amount of data or higher-rate data than that supportable by the first downlink bandwidth, wherein the second downlink bandwidth is wider than the first bandwidth; and upon change to the second downlink bandwidth to be used for downlink transmissions, transmit further control information via the communication interface circuitry, the further control information transmitted using the first downlink bandwidth and a second DCI, with a second DCI format based on the second downlink bandwidth.

9. The network node of claim 8, wherein the first downlink bandwidth is indicated in a previous or anterior DCI transmitted by the network node.

10. The network node of claim 9, wherein the previous or anterior DCI comprises explicit information about the downlink bandwidth to be used in consecutive transmissions.

11. The network node of claim 10, wherein the explicit information comprises one or more bits indicating the downlink bandwidth to monitor for downlink control signals.

12. The network node of claim 9, wherein the first downlink bandwidth is implicitly indicated as a bandwidth associated with the previous or anterior DCI, unless explicitly indicated otherwise.

13. The network node of claim 8, wherein the processing circuitry is further configured to:

start a timer upon the change to the second bandwidth and reset the timer responsive to a resource allocation in the second downlink bandwidth reaching an allocation threshold; and change back to the first bandwidth upon expiration of the timer.

14. The network node of claim 13, wherein each reset of the timer comprises restarting the timer.

15. A non-transitory computer readable medium storing computer program instructions that, when the computer program instructions are executed by a processor of a network node, cause the network node to:

configure a first downlink bandwidth to be used for downlink transmissions;

transmit control information via the communication interface circuitry, the control information transmitted using the first downlink bandwidth and a first downlink control indicator (DCI), with a first DCI format based on the first downlink bandwidth;

determine a need to change from the first downlink bandwidth to a second downlink bandwidth to facilitate downlink transmission of a larger amount of data or higher-rate data than that supportable by the first downlink bandwidth, wherein the second downlink bandwidth is wider than the first bandwidth; and upon change to the second downlink bandwidth to be used for downlink transmissions, transmit further control information via the communication interface circuitry, the further control information transmitted using the first downlink bandwidth and a second DCI, with a second DCI format based on the second downlink bandwidth.

* * * * *

UNITED STATES PATENT AND TRADEMARK OFFICE
CERTIFICATE OF CORRECTION

| | |
|---|---|
| PATENT NO. | : 12,200,750 B2 |
| APPLICATION NO. | : 18/298763 |
| DATED | : January 14, 2025 |
| INVENTOR(S) | : Lindoff et al. |

It is certified that error appears in the above-identified patent and that said Letters Patent is hereby corrected as shown below:

On the Title Page

In Item (57), under "ABSTRACT", in Column 2, Line 3, delete "indicator," and insert -- information, --, therefor.

In the Specification

In Column 1, Line 9, delete "2021," and insert -- 2021, now U.S. Pat. No. 11,659,583, --, therefor.

In Column 2, Line 20, delete "indicator." and insert -- information, --, therefor.

In Column 2, Line 41, delete "first bandwidth" and insert -- first downlink bandwidth --, therefor.

In Column 2, Line 43, delete "second bandwidth" and insert -- second downlink bandwidth --, therefor.

In Column 2, Line 45, delete "second bandwidth" and insert -- second downlink bandwidth --, therefor.

In Column 2, Lines 45-46, delete "first bandwidth," and insert -- first downlink bandwidth, --, therefor.

In Column 2, Line 53, delete "first bandwidth," and insert -- first downlink bandwidth, --, therefor.

In Column 2, Lines 56-57, delete "first bandwidth." and insert -- first downlink bandwidth. --, therefor.

In Column 3, Line 19, delete "first bandwidth" and insert -- first downlink bandwidth --, therefor.

Signed and Sealed this
Tenth Day of June, 2025

Coke Morgan Stewart
*Acting Director of the United States Patent and Trademark Office*

CERTIFICATE OF CORRECTION (continued)
U.S. Pat. No. 12,200,750 B2

In Column 3, Line 21, delete "second bandwidth" and insert -- second downlink bandwidth --, therefor.

In Column 3, Line 23, delete "second bandwidth" and insert -- second downlink bandwidth --, therefor.

In Column 3, Lines 23-24, delete "first bandwidth," and insert -- first downlink bandwidth, --, therefor.

In Column 3, Lines 32-33, delete "first bandwidth." and insert -- first downlink bandwidth. --, therefor.

In Column 5, Lines 25-26, delete "communication circuitry 32." and insert -- communication interface circuitry 32. --, therefor.

In Column 5, Line 53, delete "communication circuitry 52." and insert -- communication interface circuitry 52. --, therefor.

In Column 7, Line 23, delete "indicator" and insert -- information --, therefor.

In Column 8, Line 19, delete "first bandwidth" and insert -- first downlink bandwidth --, therefor.

In Column 8, Line 21, delete "second bandwidth" and insert -- second downlink bandwidth --, therefor.

In Column 8, Line 23, delete "second bandwidth" and insert -- second downlink bandwidth --, therefor.

In Column 8, Line 24, delete "first bandwidth," and insert -- first downlink bandwidth, --, therefor.

In Column 8, Line 33, delete "first bandwidth," and insert -- first downlink bandwidth, --, therefor.

In Column 9, Line 67, delete "first bandwidth" and insert -- first downlink bandwidth --, therefor.

In Column 10, Line 2, delete "second bandwidth" and insert -- second downlink bandwidth --, therefor.

In Column 10, Line 4, delete "second bandwidth" and insert -- second downlink bandwidth --, therefor.

In Column 10, Line 4, delete "first bandwidth," and insert -- first downlink bandwidth, --, therefor.

In Column 10, Lines 13-14, delete "first bandwidth," and insert -- first downlink bandwidth, --, therefor.

CERTIFICATE OF CORRECTION (continued)
U.S. Pat. No. 12,200,750 B2

In Column 10, Line 50, delete "schemes, code rate, etc. (MCS)" and insert -- coding schemes (MCS), code rate, etc. --, therefor.

In Column 12, Line 61, delete "smart phone, laptop" and insert -- laptop --, therefor.

In Column 12, Line 61, delete "equipped" and insert -- equipment --, therefor.

In the Claims

In Column 14, Line 23, in Claim 1, delete "indicator" and insert -- information --, therefor.

In Column 14, Line 31, in Claim 1, delete "first bandwidth;" and insert -- first downlink bandwidth; --, therefor.

In Column 14, Line 51, in Claim 6, delete "second bandwidth" and insert -- second downlink bandwidth --, therefor.

In Column 14, Line 56, in Claim 6, delete "first bandwidth" and insert -- first downlink bandwidth --, therefor.

In Column 15, Line 2, in Claim 8, delete "indicator" and insert -- information --, therefor.

In Column 15, Line 9, in Claim 8, delete "first bandwidth;" and insert -- first downlink bandwidth; --, therefor.

In Column 16, Line 1, in Claim 13, delete "second bandwidth" and insert -- second downlink bandwidth --, therefor.

In Column 16, Line 5, in Claim 13, delete "first bandwidth" and insert -- first downlink bandwidth --, therefor.

In Column 16, Line 17, in Claim 15, delete "indicator" and insert -- information --, therefor.

In Column 16, Line 24, in Claim 15, delete "first bandwidth;" and insert -- first downlink bandwidth; --, therefor.